United States Patent [19]

Uchiyama et al.

[11] Patent Number: 5,124,173
[45] Date of Patent: Jun. 23, 1992

[54] ATMOSPHERIC PRESSURE PLASMA SURFACE TREATMENT PROCESS

[75] Inventors: Hiroshi Uchiyama, Hiratsuka; Satiko Okazaki, 2-20-11, Takaidohigashi, Shuginami-ku, Tokyo; Masuhiro Kogoma, 843-15, Shimoniikura, Wako-shi,, Saitama-ken, all of Japan

[73] Assignees: E. C. Chemical Co., Ltd., Osaka; C. Itoh Fine Chemical Co., Ltd.; Satiko Okazaki, both of Tokyo; Masuhiro Kogoma, Saitama, all of Japan

[21] Appl. No.: 731,314

[22] Filed: Jul. 17, 1991

[30] Foreign Application Priority Data

Jul. 17, 1990 [JP] Japan .................................. 2-187215

[51] Int. Cl.$^5$ .................................................. B05B 3/06
[52] U.S. Cl. .......................................... 427/38; 427/444
[58] Field of Search ........................... 427/40, 38, 444

*Primary Examiner*—Bernard Pianalto
*Attorney, Agent, or Firm*—Wenderoth, Lind & Ponack

[57] ABSTRACT

According to this invention, there is provided an atmospheric pressure plasma surface treatment process comprising the steps of introducing a gas in a plasma reaction apparatus having a pair of dielectric-covered electrodes having opposing surfaces on at least one of which is provided with a solid dielectric; performing plasma excitation under atmospheric pressure; and surface treating an object placed between the opposing electrodes, wherein the gas introduced is a gaseous composition consisting essentially of argon, helium and/or ketone. This process makes it possible to quickly imparting hydrophilic nature to surfaces of an object made of a plastic to be treated. The hydrophilic nature given lasts long.

23 Claims, 1 Drawing Sheet

ATMOSPHERIC PRESSURE PLASMA SURFACE TREATMENT PROCESS

The present invention relates to an atmospheric pressure plasma surface treatment process using a gaseous composition consisting essentially of an inert gas. According to the atmospheric pressure plasma surface treatment process of the present invention, the surface of a plastic material to be treated can be imparted with hydrophilic nature rapidly using a simple device, and the hydrophilic nature lasts for a long time.

PRIOR ART

Recently, heat-shrinkable films have been used widely for packaging. Since they have generally poor printability just after stretching, heat-shrinkable films are subjected to corona discharge treatment to refine their surfaces before they can be printed. The corona discharge treatment is performed in an atmosphere of air by bringing a plurality of needle-shaped electrodes arranged in a line close to the surface of a film wound around a roll and applying a high voltage between the roll and the electrodes. The corona discharge treatment is to generate crown-like (corona-like) discharge at tips of needle-like electrodes and refine film surfaces by etching with oxygen in the air.

The corona discharge treatment involves occurrence of sparks which form pinholes on the film, or in the case of heat-shrinkable films the films tend to be shrunk due to heat generation, and often the effect of surface refinement does not last so long. Therefore, it has been desired to avoid these disadvantages.

On the other hand, a surface treatment process has recently been put into practice in which glow discharge is carried out in an inert gas such as helium or argon under a high vacuum and trace amounts of argon ion generated in a high vacuum is utilized for the surface treatment of an object to be treated. However, in order to continuously perform such a high vacuum plasma surface treatment, a series of equipments such as supplier of the object to be treated, take-up device and the like must be placed under a high vacuum together with the plasma reaction apparatus, which increases initial cost greatly. Therefore, high vacuum plasma surface treatment has been put onto practice only for expensive objects such as electronic parts and rarely applicable to cheap objects.

PRESENT INVENTION

An object of the present invention is to provide a surface treatment process which can obviate the aforementioned disadvantages of the corona discharge surface treatment and vacuum plasma surface treatment.

According to the present invention, there is provided an atmospheric pressure plasma surface treatment process comprising the steps of; introducing a gas in a plasma reaction apparatus having a dielectric-covered electrode having opposing surfaces on at least one of which is provided with a solid dielectric; performing plasma excitation under atmospheric pressure; and surface treating an object placed between the opposing electrodes, wherein the gas introduced is a gaseous composition consisting essentially of argon, helium and/or ketone.

In the atmospheric pressure plasma surface treatment process according to embodiment A of the present invention, the gasous composition consists essentially of 90 to 10% by volume of argon and 10 to 90% by volume of helium (provided that total of argon and helium is 100% by volume; hereafter, the same proviso applies), preferably, 80 to 20% by volume of argon and 20 to 80% by volume of helium, more preferably 60 to 40% by volume of argon and 40 to 60% by volume of helium. More than 90% by volume of argon is undesirable because glow discharge becomes unstable while use of helium exceeding 90% by volume is economically disadvantageous and requires longer time for performing surface refinement treatment such as treatment for imparting hydrophilic nature.

In the atmospheric pressure plasma surface treatment process according to embodiment B of the present invention, the gaseous composition consists essentially of 90 to 10% by volume of argon, and 9.9 to 70% by volume of helium, and 0.1 to 20% by volume of a ketone (provided that total of argon, helium and the ketone is 100% by volume; hereafter, the same proviso applies), preferably, 80 to 20% by volume of argon, 19 to 65% by volume of helium, and 1 to 15% by volume of the ketone, more preferably 60 to 40% by volume of argon, 39 to 50% by volume of helium, and 1 to 10% by volume of the ketone. More than 90% by volume of argon is undesirable because glow discharge becomes unstable while use of helium exceeding 70% by volume is uneconomical, and requires longer time for performing surface refinement treatment such as treatment for imparting hydrophilic nature. Further, when more than 10% by volume of ketone is used, acetone condenses on the wall of the reaction vessel at room temperature, with one result that the concentration of acetone in the reaction vessel becomes non-uniform.

In the atmospheric pressure plasma surface treatment process according to embodiment C of the present invention, the gaseous composition consists essentially of 99.9 to 10% by volume of argon and 0.1 to 90% by volume of a ketone (provided that total of argon and the ketone is 100% by volume; hereafter, the same proviso applies), preferably, 99 to 80% by volume of argon and 1 to 20% by volume of the ketone. More than 99.9% by volume of argon is undesirable because glow discharge becomes unstable while use of the ketone exceeding 90% by volume is undesirable since although discharge does occur, the discharge is colorless and as a result power is too high.

In the atmospheric pressure plasma surface treatment method according to the present invention, the gaseous composition which can be used consists essentially of argon, and helium and/or a ketone. However, it may contain other kinds of gases other than argon, helium and the ketone. Such additional gases are those gases which have been used conventionally in vacuum plasma surface treatment processes or atmospheric pressure plasma surface treatment processes. Examples of the additional gases include inert gases such as neon, and nitrogen; active gases such as oxygen, ethylene, propylene, acetylene, halogen, monosilanes, and fluoroethylene compounds; and the like.

The ketones which can be used in the plasma surface treatment process of the present invention are aliphatic saturated ketones preferably having 3 to 6 carbon atoms, such as acetone, methyl ethyl ketone, methyl propyl ketone, isopropyl methyl ketone, methyl butyl ketone, and methyl isobutyl ketone. among these, preferred are acetone and xethyl ethyl ketone, with acetone being particularly preferred.

The atmospheric pressure plasma surface treatment process according to the present invention has advantages in that it makes it possible to quickly and continuously carry out refinement of the surface properties of an object to be treated made of a material having a low thermal resistance such as a plastic film, particularly a heat-shrinkable plastic film, a synthetic fiber, or a synthetic fiber cloth, particularly imparting hydrophilic nature and decreasing electrifiability using a very simple apparatus because the process involves minimal heat generation, and in addition that the effect of refinement lasts for a long time.

Other features, advantages and effects of the present invention will become apparent by the detailed explanation below with reference to the attached drawings, in which:

BRIEF DESCRIPTION OF THE DRAWINGS

Referring to FIGS. 1 and 2, an embodiment of the present invention will be explained more specifically.

DETAILED DESCRIPTION OF THE DRAWINGS

Figure 1:
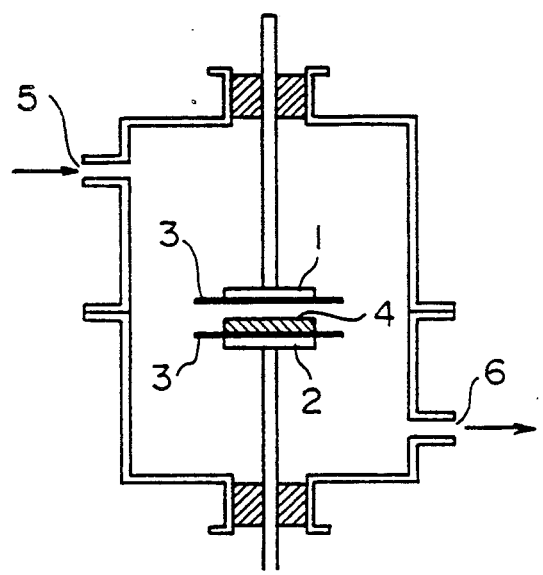
FIG. 1 is a cross-sectional view showing an example of the plasma reaction apparatus used in the present invention.

FIG. 1 is a cross-sectional view schematically showing a plasma reaction apparatus for carrying out atmospheric pressure plasma surface treatment by holding an object to be treated between electrodes at a standstill. An upper electrode 1 and a lower electrode 2 are provided opposing one to another. A dielectric coating or layer 3 is affixed on a lower side of the electrode 1 and on an upper side of the lower electrode 2 as well. As the material of the dielectric layer 3, there can be cited, for example, a polyimide, mica, a ceramic, glass, and the like. The dielectric layer 3 is necessary for continuing glow discharge in a stable state. When the object to be treated is a relatively thick plastic film, the dielectric layer may be affixed only to the upper layer 1.

On the upper side of the lower electrode 2 is placed an object 4 to be treated, for example, a heat-shrinkable polypropylene film. Then, an inert gaseous composition, for example, a mixed gas composed of 50% by volume of argon and 50% by volume of helium is introduced through an inlet port 5, and discharged from an outlet port 6. While the flow rate of the gas is freely set up to a desired value, the gas introduction may be stopped when the residual air within the apparatus is completely replaced by the mixed gas.

Next, a high frequency voltage of 200 Hz is applied between the upper and lower electrodes to cause glow discharge to take place to perform plasma excitation in order to surface-treat the object.

Figure 2:
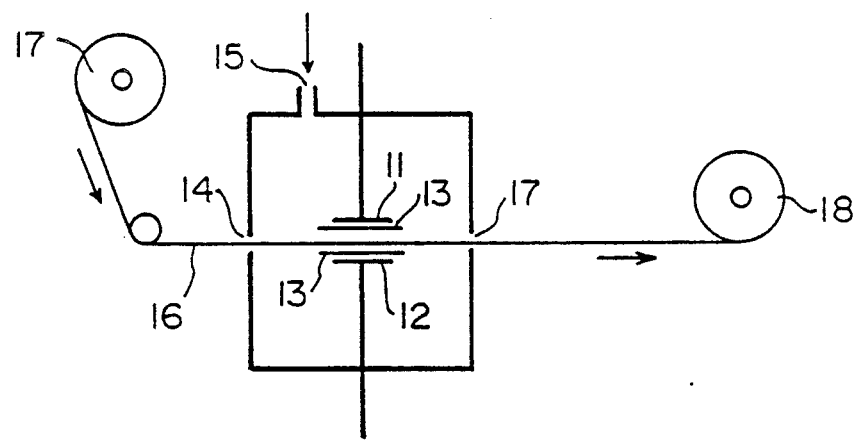
FIG. 2 is a cross-sectional view showing an example of the apparatus used in the present invention which carries out atmospheric pressure plasma surface treatment continuously.

FIG. 2 illustrates an example of the atmospheric pressure surface treatment process of the present invention in which a plastic film is continuously surface-treated. A pair of opposing electrodes, i.e., an upper electrode 11 and a lower electrode 12 have respective dielectric coatings or layers 13 on their lower and upper sides, respectively. Through a slit 14 provided in the wall of the plasma reaction apparatus is supplied a film 16 to be surface-treated and enters the apparatus. The film is continuously supplied from a supply roll 17. The film passes a space defined between the upper and lower electrodes, goes out of the apparatus through a slit 17 formed in the wall of the apparatus and is taken up on a takeup roll 18. An inert gas is continuously supplied into the plasma reaction apparatus through a gas supply port 15 and flows out of the apparatus through the slits 14 and 17. The inside of the plasma reaction apparatus is kept at a suitable, slightly superatmospheric pressure so that the air outside the apparatus will not flow in the apparatus.

In the present invention, glow discharging is performed in order to plasma-excite the inert gas or gases. The frequency of an AC power source used then is not limited particularly, but is preferably 200 to 100,000 Hz, more preferably 500 to 100,000 Hz, and most preferably 1,000 to 10,000 Hz. If the frequency is lower than 200 Hz, discharge is unstable and is not in a glow state. On the other hand, if the frequency exceeds 100,000 Hz, much heat is generated and films having low thermal resistances tend to be deformed. Therefore, frequencies outside the aforementioned range are undesirable.

Conditions such as voltage, intensity of current, and power upon glow discharging may be selected properly depending on the nature of the object to be treated. Generally, voltage is preferably 2,000 to 4,000 V, intensity of current is preferably 10 to 80 mA, and power is preferably 10 to 500 W.

Time for which the object is plasma-treated may also be selected properly depending on the nature of the object. Generally, treating time used is 0.1 to 600 seconds, and preferably 5 to 120 seconds.

According to the atmospheric pressure plasma surface treatment process of the present invention, it is possible to carry out surface treatment continuously and quickly using a very simplified apparatus as compared with conventional vacuum plasma surface treatment processes, which gives rise to a great industrial and technical progress. In addition, the object treated by the atmospheric pressure surface treatment process of the present invention exhibits considerable surface refinement effects. For example, in the case of the object made of a hydrophobic plastic, the surface can be readily imparted with hydrophilic nature, and the hydrophilic nature lasts for a long time. For example, the hydrophilic nature given by a conventional corona discharge treatment is almost lost in only half a day in contrast to the hydrophilic nature given by the present invention which will not be lost after repeating washing 20 or more times.

Furthermore, the atmospheric pressure plasma surface treatment process of the present invention has an additional advantage that a small amount of heat is generated so that the process can be applied to objects having poor thermal resistances.

Since it has the aforementioned advantages, the atmospheric pressure plasma surface treatment process of the present invention is applicable to surface refinement of various synthetic polymer molded articles such as plastic sheets, plastic films, synthetic fiber cloths, and synthetic fibers. As for such molded articles, there can be cited, for example, heat-shrinkable sheet such as polypropylene sheet, polyethylene sheet, and vinyl chloride sheet, general film and sheet, such as polypropylene film and sheet, polyethylene film and sheet, vinyl chloride film and sheet, nylon film and sheet, polyester film and sheet, poly(vinyl acetate/ethylene) film and sheet, fluororesin film and sheet, poly(p-phenylterephthalamide) (aramide resin) film and sheet, and polyimide film and sheet, as well as synthetic fibers or chemical fibers, cloths, woven fabrics, unwoven fabrics, made of polyester, polypropylene, nylon, acrylic resin, acetate,; and mixed fabrics such as cloths, woven fabrics and unwoven fabrics of the synthetic fibers and/or chemical fibers and/or natural fibers.

Heat-shrinkable polypropylene films subjected to the atmospheric pressure plasma surface treatment process of the present invention have surfaces imparted with hydrophilic nature and therefore their hygroscopicity is improved considerably so that they can be used for preparing underwear, thus being practically useful.

Hereafter, the present invention will be explained more concretely by way of examples, unless otherwise indicated specifically, amounts of gases are by volume.

EXAMPLE 1

Heat-shrinkable polypropylene film of 6 micron thick was used as a sample. Kapton film of 50 micron thick was cut to pieces each having a size larger than the sizes of the electrode plates (exceeding about 10 mm on each side). Two pieces were bonded with silicone grease on the upper and lower electrode plates, respectively, in the plasma reaction vessel. The sample film was placed on the lower electrode, and a mixed gas composed of 60 parts and 40 parts of helium gas was introduced into the vessel through the gas inlet port. When the air within the vessel was completely replaced by the mixed gas, AC current of 10,000 Hz, 4000 V and 20 mA was applied to establish a high frequency voltage between the upper and lower electrode plates. Violet glow discharge occurred to cause plasma excitation and application of current was continued for 5 seconds in that state. Then the sample was taken out and its surface wetting energy was examined with dyne liquid available from Wako Pure Chemical Industries.

As a result, untreated samples repelled the liquid at 30 dynes but treated samples did not repel the liquid at all even at 56 dynes or more, which indicated considerable increase in hydrophilic nature.

EXAMPLES 2 to 9

Examples 2 to 9 were practiced using the same apparatus and samples as those used in Example 1 with varying the mixing ratios of gases, frequencies, applied voltages as shown in Table 1 to examine how hydrophilic nature changed. Results obtained are shown in Table 1.

When the amount of acetone reached 20 parts, vapor of acetone condensed on the inner wall of the vessel to form drops. This suggested that at room temperature 20 parts of acetone is a limit. Upon heating the vessel, the drops disappeared quickly.

TABLE 1

| Example | Argon | Helium | Acetone | Frequency | Voltage | Dyne |
|---|---|---|---|---|---|---|
| 2 | 40 parts | 60 parts | — | 10,000 Hz | 4,000 V | 56 dyn on more |
| 3 | 40 parts | 60 parts | — | 1,000 Hz | 5,500 V | 56 dyn on more |
| 4 | 60 parts | 39 parts | 1 part | 10,000 Hz | 4,000 V | 56 dyn on more |
| 5 | 60 parts | 30 parts | 10 parts | 10,000 Hz | 4,000 V | 50 dyn |
| 6 | 40 parts | 59 parts | 1 part | 10,000 Hz | 4,000 V | 56 dyn on more |
| 7 | 40 parts | 50 parts | 10 parts | 10,000 Hz | 4,000 V | 40 dyn |
| 8 | 80 parts | — | 20 parts | 10,000 Hz | 4,000 V | 53 dyn |
| 9 | 99 parts | — | 1 part | 10,000 Hz | 4,000 V | 56 dyn or more |
| Comparative* | — | — | — | — | — | 30 dyn or less |

*Measurement of wetting energy on untreated, heat-shrinkable polypropylene films used in Examples 1 to 9.

EXAMPLE 10

White cloth of 100% polyester was used as a sample. The cloth was washed once to remove starch and dried before use. Kapton film of 70 micron thick was bonded with silicone grease on each of the upper and lower electrode plates in the plasma reaction vessel. The sample white cloth was placed on the lower electrode plate, and a mixed gas composed of 60 parts of argon gas and 40 parts of helium gas was introduced into the vessel through the gas inlet port. When the air within the vessel was completely replaced by the mixed gas, AC current of 10,000 Hz, 4000 V and 20 mA was applied to establish a high frequency voltage between the upper and lower electrode plates. Violet glow discharge occurred to cause plasma excitation and application of current was continued for 1 minute in that state. After completion of the treatment, the treated cloth was floated on water. Then the treated portion got wetted in 0.1 second to become transparent. Untreated sample was left as is for 24 hours or more and did not get wetted at all, thus showing very strong water repellency.

EXAMPLES 11 and 12

Examples 11 and 12 were practiced using the same polyester sample as in Example 10 in the same apparatus as in Example 10 with varying the mixing ratios of gases as shown in Table 2. Results obtained are shown in Table 2.

TABLE 2

| Example | Argon | Helium | Acetone | Frequency | Voltage | Time (second) in which sample gets wetted |
|---|---|---|---|---|---|---|
| 11 | 60 | 30 | 10 | 10,000 Hz | 4,000 V | 0.5 |
| 12 | 80 | — | 20 | — | — | 0.3 |
| untreated** | — | — | — | — | — | No wetting for 24 hours or more |

**Measurement of hydrophilic nature on untreated polyester films used in Examples 10 to 12.

The treated samples exhibited high washing resistances and their hydrophilic nature was very strong so that it lasted after repeating 30 times washing in a washing machine using a neutral detergent.

TABLE 3

| (Washing resistance; after 30 washings) | |
|---|---|
| Example | Time in second in which water penetrates treated surface when floated on water surface |
| Example 10 | 0.1 |
| Example 11 | 0.8 |
| Example 12 | 0.8 |
| Comparative Example | 24 hours or more |

The above data including comparative example were obtained by measuring time in second in which samples got wetted after 10 minutes' washing in an electric washing machine, rinsed with water and dried and then floated on water surface.

EXAMPLE 13

White 100% nylon cloth was used as a sample which was washed to remove starch.

Polyester film of 100 micron thick was bonded with an instantaneous adhesive on each of the upper and lower electrode plates in the plasma reaction vessel. The sample white cloth was placed on the lower electrode plate, and a mixed gas composed of 50 parts of argon gas and 50 parts of helium gas was introduced into the vessel through the gas inlet port. When the air within the vessel was completely replaced by the mixed gas, AC current of 3,000 Hz, 4500 V and 20 mA was applied to establish a high frequency voltage between the upper and lower electrode plates. Immediately thereafter, violet glow discharge started, and plasma excitation took place. Application of current was continued for 1 minute in that state. After completion of the treatment, the sample was floated on water. Then, only the area of cloth corresponding to the electrode plate got wetted with water and turned translucent because of water which penetrated the cloth. Untreated samples did not get wetted with water at all initially, and it took 1 hour or more for water to penetrate the entire cloth in 0.1 second to become transparent. It took 0.5 second for water to penetrate the treated sample and for the sample to turn translucent. When this sample was washed 30 times similarly to preceding examples using polyester, it took 0.8 second for water to penetrate the sample, thus demonstrating very strong hydrophilic nature.

EXAMPLE 14

Polypropylene heat-shrinkable film of 6 micron thick was used as a sample.

Kapton of 50 micron thick cut to a size slightly larger than the electrode plates was affixed with silicone grease on each of the upper and lower electrode plates in the plasma reaction vessel. The sample was placed on the lower electrode plate, and a mixed gas composed of 60 parts of argon gas and 40 parts of helium gas was introduced into the vessel through the gas inlet port. When the air within the vessel was completely replaced by the mixed gas, AC current of 3,000 V, 5000 Hz, 20 mA, and 40 W was applied to establish a high frequency voltage between the upper and lower electrode plates. Violet glow discharge occurred to cause plasma excitation. Application of current was continued for 5 seconds in that state. Thereafter, the sample was taken out and the state of wetting of the surface was examined with Dyne liquid available from Wako Pure Chemical Industries.

As a result, untreated samples repelled the liquid at 30 dynes but treated samples did not repel the liquid at all even at 56 dynes or more, which indicated considerable increase in hydrophilic nature.

EXAMPLE 15

White cloth of 100% polyester was used as a sample.

Kapton of 70 micron thick was affixed with silicone grease on each of the upper and lower electrode plates in the plasma reaction vessel.

The sample was placed on the lower electrode plate, and a mixed gas composed of 10 parts of argon gas and 90 parts of helium gas was introduced into the vessel through the gas inlet port. When the air within the vessel was completely replaced by the mixed gas, AC current of 3,500 V, 500 Hz, 10 mA, and 30 W was applied to establish a high frequency voltage between the upper and lower electrode plates. Violet glow discharge occurred to cause plasma excitation. Application of current was continued for 2 minutes in that state.

Thereafter, the sample was taken out and was floated on water. Then the treated portion gradually got wetted with water. In about 10 seconds, only the portion corresponding to the size of the electrode plate became transparent. Untreated portion repelled water and did not show wetting with water at all and remained as a white cloth.

EXAMPLE 16

Polyethylene film of 15 micron thick was used as a sample. This was made of a low density polyethylene and susceptible to thermal deformation.

Mica plate of 50 micron thick was affixed with silicone grease on each of the upper and lower electrode plates in the plasma reaction vessel.

The polyethylene film was held on the lower electrode plate, and a mixed gas composed of 50 parts of argon gas and 50 parts of helium gas was introduced into the vessel through the gas inlet port. When the air within the vessel was completely replaced by the mixed gas, AC current of 1,000 Hz, 4,000 V, 1 to 2 mA, and 20 W was applied to establish a high frequency voltage between the upper and lower electrode plates.

Violet glow discharge occurred to cause plasma excitation Application of current was continued for 8 hours in that state. Thereafter, the polyethylene film was taken out and the state of wetting was examined with water. As a result, it revealed that the plasma-treated portion got wetted with water completely while other portion repelled water. Further, it was able to write letters with a fountain pen containing an aqueous ink without repellency. As for wetting of the surface, untreated portion repelled water at 30 dynes but treated portion at 48 dynes.

EXAMPLE 17

White cloth of 100% nylon was used as a sample.

Kapton of 50 micron thick was affixed with silicone grease on each of the upper and lower electrode plates in the plasma reaction vessel.

The sample was placed on the lower electrode plate, and a mixed gas composed of 80 parts of argon gas and 20 parts of helium gas was introduced into the vessel through the gas inlet port. When the air within the vessel was completely replaced by the mixed gas, AC current of 2,500 V, 100,000 Hz, 30 mA, and 80 W was applied to establish a high frequency voltage between the upper and lower electrode plates. Violet glow discharge occurred to cause plasma excitation. Application of current was continued for 1 minute in that state.

Thereafter, the sample was taken out and was floated on water. Then the treated portion quickly got wetted with water and turned transparent in an area as large as the electrode plate. Untreated portion remained unchanged white cloth. However, it underwent considerable thermal deformation, and at a standstill a frequency of 100,000 Hz was felt to be a limit. Time required for wetting with water was 0.5 second for treated portion and 60 minutes for untreated portion.

EXAMPLE 18

White cloth of 100% polyester was used as a sample.

PET film of 100 micron thick was affixed with silicone grease on each of the upper and lower electrode plates in the plasma reaction vessel.

The 100% polyester cloth sample was held on the lower electrode plate, and a mixed gas composed of 50 parts of argon gas and 50 parts of helium gas was introduced into the vessel through the gas inlet port. When the air within the vessel was completely replaced by the mixed gas, AC current of 1,000 Hz, 3,000 V, 30 mA, and 60 W was applied to establish a high frequency voltage between the upper and lower electrode plates.

Violet glow discharge occurred to cause plasma excitation. Application of current was continued for 1 minute in that state.

After completion of the treatment, the treated cloth was floated on water. Then the treated portion quickly got wetted with water and turned in a transparent touch. Untreated portion remained to exhibit high water repellency and did not get wetted with water at all. Even when it was left to be floated on water for 24 hours, only an area as large as the electrode plate got wetted with water and other portion remained unchanged white cloth. This was dried, washed using a neutral detergent in an electric washing machine. After repeating a cycle of washing, rinsing with water and drying no less than 30 times, the effect was unchanged. Time required for wetting with water was 0.1 second for the treated portion and 24 hours for the untreated portion.

EXAMPLE 1

White cloth of 100% nylon was used as a sample.

Kapton film of 50 micron thick was affixed with silicone grease on each of the upper and lower electrode plates in the plasma reaction vessel.

The sample was placed on the lower electrode plate, and a mixed gas composed of 50 parts of argon gas, 45 parts of helium gas, and 5 parts of acetone was introduced into the vessel through the gas inlet port. Acetone was supplied by passing helium gas through a gas washing bottle containing 300 ml of acetone to bubble helium in the acetone layer so that helium was saturated with acetone. The washing bottle was heated at 25° to 260° C. to minimize cooling due to evaporation. Under the conditions, the mixed gas composed of helium gas and acetone contained 9.8 to 10.4%, and in average 10% of acetone according to measurement by gas chromatography. When the air within the vessel was completely replaced by the mixed gas, AC current of 3,000 Hz, 2,500 V, 20 mA, and 60 W was applied to establish a high frequency voltage between the upper and lower electrode plates.

Immediately, blue glow discharge occurred to cause plasma excitation. Application of current was continued for 1 minute in that state. Glow discharge was very stable. Plasma-treated portion of the sample corresponding to the size of the electrode was of a high hydrophilic nature so that when it was floated on water, only that portion became transparent, thus showing a clear difference.

EXAMPLE 20

Propylene heat-shrinkable film of 6 micron thick was used as a sample.

Mica plate of 30 micron thick was affixed with silicone grease on each of the upper and lower electrode plates in the plasma reaction vessel.

The sample was placed on the lower electrode plate, and a mixed gas composed of 70 parts of argon gas, 32 parts of helium gas, and 8 parts of acetone was introduced into the vessel through the gas inlet port. The mixed gas was prepared by passing helium gas through a gas washihg bottle containing acetone to saturate helium gas with acetone. The washing bottle was heated at 35° C., the concentration of acetone was about 20% upon measurement by gas chromatography. The amount of acetone was 300 ml. When the air within the vessel was completely replaced by the mixed gas, AC current of 5,000 Hz, 2,800 V, 20 mA, and 40 W was applied to establish a high frequency voltage between the upper and lower electrode plates.

Bluish white glow discharge occurred to cause plasma excitation. Application of current was continued for 3 seconds in that state.

After completion of the treatment, the treated surface showed a considerably high hydrophilic nature. It was possible to write letters without repelling with a fountain pen with aqueous ink. At an untreated portion it was quite impossible to write letters. Acetone drops were found at the gas outlet port portion, which showed that introducing of more acetone was useless unless the apparatus was heated.

Dyne-untreated: 36 dynes; Dyne-treated; 56 dynes.

EXAMPLE 21

Film of polychlorotrifluoroethylere (Daikin Kogyo Co., Ltd.; Neoflon CTFE) of 100 microns thick was used as a sample.

Ceramic plate of 0.5 mm thick was affixed with a rubber adhesive on each of the upper and lower electrode plates in the plasma reaction vessel. The sample was placed on the lower electrode plate, and a mixed gas composed of 99.5 parts of argon gas, and 0.5 parts (by volume) of acetone was introduced into the vessel through the gas inlet port. When the air within the vessel was completely replaced by the mixed gas, AC current of 3,000 Hz, and 4,500 V was applied to establish a high frequency voltage between the upper and lower electrode plates. Beautiful bluish white glow discharge occurred to cause plasma excitation. Current was 20 mA, and power was 80 W. After discharging was continued for 30 seconds, the sample was taken out and examined for surface adhesiveness as follows.

Untreated Neoflon CTFE and one treated according to the invention were bonded on glass plates, respectively, using a 2-part system epoxy adhesive (commercially available from Konishi, 10 minutes' curing). After standing for 1 hour, adhesion was examined. The untreated film was not bonded at all but the treated film of the instant example was bonded very strongly.

EXAMPLE 22

Tetrafluoroethylene/perfluoroalkyl vinyl ether copolymer is also called Teflon PFA. In this test, Neoflon PFA produced by Daikin Kogyo Co., Ltd. was used.

This film had strong water and oil repellencies, and was difficult to be bonded. However, the film of 100 microns thick was plasma-treated similarly to Example 21 except that the conditions were changed to 99 parts of argon and 1 part of acetone (by volume), 5,000 Hz, and 4,000 V. The treated sample showed a considerably high adhesion in the same manner as Example 21.

EXAMPLE 23

Tetrafluoroethylene/hexafluoropropylene copolymer is also called Teflon FEP. In this test, Neoflon FEP produced by Daikin Kogyo Co., Ltd. was used. Film of this copolymer having a thickness of 50 microns was used as a sample for plasma-treatment similarly to Example 21. The proportion of argon gas to acetone was changed to 98 parts of argon to 2 parts of acetone, and discharge was carried out at 1,000 Hz and at 5,000 V. Current was 15 mA and power was 60 W.

Untreated film had strong water and oil repellencies, and repelled oil ink completely and it was difficult to write letters thereon with oil ink. On the contrary, treated film lost both water and oil repellencies and enabled writing letters thereon either with oil ink or with aqueous ink. Of course, it had increased adhesion.

EXAMPLE 24

Tetrafluoroethylene/ethylene copolymer (Neoflon ETFE, produced by Daikin Kogyo Co., Ltd.) was treated in the same manner as in Example 23. The same results as in Example 23 were obtained upon comparison of treated film with untreated film.

EXAMPLE 25

Teflon film (FEP) of 25 microns thick was used as a sample.

Kapton of 100 microns thick cut to a size larger than the electrode plate was affixed with silicone grease on each of the upper and lower electrode plates in the plasma reaction vessel. The sample was placed on the lower electrode plate, and a mixed gas composed of 99.9 parts of argon gas, and 0.1 part of acetone was introduced into the vessel through the gas inlet port. When the air within the vessel was completely replaced by the mixed gas, AC current of 3,500 V, 5,000 Hz, 20 mA, and 40 W was applied to establish a high frequency voltage between the upper and lower electrode plates. Pale blue glow discharge occurred to cause plasma excitation. Application of current was continued for 30 seconds in that state. Thereafter, the sample was taken out and wetting of the surface was examined.

Cellophane tape was not bonded on untreated film and peeled thereof while it was bonded on the treated films in the same manner as ordinary paper or films. No problem was found in writing with a ball point pen, or a pen with aqueous ink or oil ink. However, writing under such conditions was quite impossible on untreated films.

To note, upon measurement on surface dyne with a wetting agent, water repelling occurred 56 dynes or more for the treated film and 30 dynes or less for untreated films, was able to be done on treated films.

In this example, acetone was introduced by passing a portion of argon gas above acetone contained in a washing bottle so that argon gas contained acetone, and introducing the resulting mixed gas into the plasma reaction vessel, the amount of acetone was measured by gas chromatography.

EXAMPLE 26

Aramide film (poly(p-phenyl terephthalamide) film) of 50 microns thick was used as a sample. As the aramide film was used Aramica film (trade name for a product by Asahi Chemical Industry Co., Ltd.). This was treated in the same manner as in Example 25. Then, aluminum was deposited on the surfaces thereof.

When it was tried to deposit Al in vacuum on untreated aramide film, Al was not bonded on the surfaces of the aramide film and readily peeled off with cellophane adhesive tape. However, when Al was vacuum-deposited on a plasma-treated aramide film, Al was bonded well on the film, and was not peeled off with a cellophane adhesive tape. Upon measurement of wetting of surfaces with Dyne liquid, water repellency was observed at 54 dynes or more for the treated film superior to the untreated film which showed 35 dynes.

EXAMPLE 27 m-Aramide woven fabric was plasma-treated in the same manner as in Example 25, this was dyed together with untreated woven fabric in the dying solution.

| | |
|---|---|
| Irgalan Blue 3GL 200% (Ciba Geigy) | 100 g |
| Eskol T-150 (dispersant, Senka Co., Ltd.) | 1 g |
| Water to make | 1 liter |

In the above solution were dipped treated cloth and untreated cloth, and they were dyed at 100° C. After 1 hour, the cloths were washed with water. The treated cloth was dyed by 30% more deeply than the untreated cloth. Therefore, the plasma treatment made it possible to save dyes.

EXAMPLE 28

Polyimide film (trade name: Kapton film) of 25 microns thick was used as a sample.

In the same vessel as in Example 25 were charged the same samples as in Example 25, and a mixed gas composed of 99.5 parts of argon gas and 0.5 part of methyl ethyl kepton was introduced in the vessel. The same voltage conditions as in Example 25 were established to excite plasma, and plasma treatment was continued for 1 minute.

Kapton thus treated had increased surface wetting, and remarkable adhesion with a commercially available 2-part system adhesive. Film of 10 mm wide showed an adhesion strength of 3.5 kg. Considering untreated one did not bond, it revealed that plasma surface treatment was effective for refining the surface of Kapton.

What is claimed is:

1. At atmospheric pressure plasma surface treatment process comprising the steps of:
   introducing a gas in a plasma reaction apparatus having a pair of dielectric-covered electrodes having opposing surfaces on at least one of which is provided with a solid dielectric;
   performing plasma excitation under atmospheric pressure; and
   surface treating a molded polymer article placed between the opposing electrodes, wherein the gas introduced is a gaseous composition consisting essentially of (1) argon and (2) a member selected from the group consisting of helium, ketone and a mixture of helium and ketone.

2. A process as claimed in claim 1, wherein said gaseous composition consists essentially of 90 to 10% by volume of argon, and 10 to 90% by volume of helium.

3. A process as claimed in claim 2, wherein said gaseous composition consists essentially of 80 to 20% by volume of argon, and 20 to 80% by volume of helium.

4. A process as claimed in claim 2, wherein said gaseous composition consists essentially of 60 to 40% by volume of argon, and 40 to 60% by volume of helium.

5. A process as claimed in claim 1, wherein said gaseous composition consists essentially of 90 to 10% by volume of argon, 0 to 89.9% by volume of helium, and 0.1 to 20% by volume of a ketone.

6. A process as claimed in claim 5, wherein said gaseous composition consists essentially of 80 to 20% by volume of argon, 19 to 65% by volume of helium, and 1 to 15% by volume of a ketone.

7. A process as claimed in claim 6, wherein said ketone is an aliphatic ketone having 3 to 6 carbon atoms.

8. A process as claimed in claim 5, wherein said gaseous composition consists essentially of 60 to 40% by volume of argon, 30 to 59% by volume of helium, and 1 to 15% by volume of a ketone.

9. A process as claimed in claim 8, wherein said ketone is an aliphatic ketone having 3 to 6 carbon atoms.

10. A process as claimed in claim 5, wherein said ketone is an aliphatic ketone having 3 to 6 carbon atoms.

11. A process as claimed in claim 1, wherein said gaseous composition consists essentially of 99.9 to 10% by volume of argon, and 0.1 to 90% by volume of a ketone.

12. A process as claimed in claim 11, wherein said ketone is an aliphatic ketone having 3 to 6 carbon atoms.

13. A process as claimed in claim 1, wherein said gaseous composition consists essentially of 99 to 80% by volume of argon, and 1 to 20% by volume of a ketone.

14. A process as claimed in claim 13, wherein said ketone is an aliphatic ketone having 3 to 6 carbon atoms.

15. A process as claimed in claim 1, wherein said ketone is an aliphatic ketone having 3 to 6 carbon atoms.

16. A process as claimed in claim 15, wherein said ketone is acetone or methyl ethyl ketone.

17. A process as claimed in claim 16, wherein said ketone is acetone.

18. A process as claimed in claim 1, wherein said plasma excitation is performed using an Alternating current power source of a frequency of 200 to 100,000 Hz.

19. A process as claimed in claim 18, wherein said plasma excitation is performed using an Alternating current power source of a frequency of 1,000 to 10,000 Hz.

20. A process as claimed in claim 1, wherein said molded polymer article is made of a synthetic polymer material.

21. A process as claimed in claim 20, wherein said molded polymer article is made of a plastic film.

22. A process as claimed in claim 21, wherein said plastic film is a heat-shrinkable plastic film.

23. A process as claimed in claim 20, wherein said molded polymer article is a synthetic fiber or a synthetic fiber cloth.

* * * * *

UNITED STATES PATENT AND TRADEMARK OFFICE
CERTIFICATE OF CORRECTION

PATENT NO. : 5,124,173
DATED : June 23, 1992
INVENTOR(S) : Hiroshi Uchiyama, et al It is certified that error appears in the above-indentified patent and that said Letters Patent is hereby corrected as shown below:

On the title page, Item [75] should read: —Hiroshi Uchiyama, Hirakata-shi; Satiko Okazaki, Tokyo; Masuhiro Kogoma, Wako-shi, all of Japan—.

Column 9, line 45, delete "EXAMPLE 1" and insert —EXAMPLE 19—.

Signed and Sealed this

Twelfth Day of October, 1993

Attest:

BRUCE LEHMAN

*Attesting Officer*   Commissioner of Patents and Trademarks